(12) United States Patent
Liao et al.

(10) Patent No.: US 11,067,764 B2
(45) Date of Patent: Jul. 20, 2021

(54) OPTICAL TRANSCEIVER

(71) Applicant: Prime World International Holdings Ltd., New Taipei (TW)

(72) Inventors: Ting-Jhang Liao, New Taipei (TW); YI-Ju Wang, New Taipei (TW); Ming-You Lai, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/381,835

(22) Filed: Apr. 11, 2019

(65) Prior Publication Data

US 2020/0326495 A1 Oct. 15, 2020

(51) Int. Cl.
*G02B 6/36* (2006.01)
*G02B 6/42* (2006.01)

(52) U.S. Cl.
CPC ......... *G02B 6/4292* (2013.01); *G02B 6/4214* (2013.01)

(58) Field of Classification Search
CPC .. G02B 6/4214; G02B 6/4292; G02B 6/4284; G02B 6/36
See application file for complete search history.

(56) References Cited

U.S. PATENT DOCUMENTS

| | | | |
|---|---|---|---|
| 5,619,604 A | 4/1997 | Shiflett et al. | |
| 7,090,509 B1* | 8/2006 | Gilliland | G02B 6/4246 385/92 |
| 7,802,925 B2* | 9/2010 | Shimizu | G02B 6/4292 385/137 |
| 7,850,374 B2 | 12/2010 | Vancoille | |
| 8,297,856 B2 | 10/2012 | Banal, Jr. et al. | |
| 10,739,528 B1* | 8/2020 | Liao | G02B 6/3825 |
| 2012/0027346 A1 | 2/2012 | Castagna et al. | |
| 2013/0216190 A1* | 8/2013 | Haley | G02B 6/423 385/79 |
| 2016/0246019 A1 | 8/2016 | Ishii et al. | |
| 2017/0227718 A1 | 8/2017 | Akieda et al. | |
| 2019/0121040 A1 | 4/2019 | Lin | |

FOREIGN PATENT DOCUMENTS

WO 2013126315 A2 8/2013

OTHER PUBLICATIONS

U.S. Office Action dated Oct. 4, 2018, received in U.S. Appl. No. 15/792,013, 11 pgs.
U.S. Office Action dated Apr. 17, 2019, received in U.S. Appl. No. 15/792,013, 17 pgs.
Chinese Office Action with Machine Translation dated Jun. 1, 2020, received in Chinese Application No. 201910312299.7, 13 pgs.

* cited by examiner

*Primary Examiner* — Jennifer Doan
(74) *Attorney, Agent, or Firm* — Grossman Tucker Perreault & Pfleger, PLLC

(57) ABSTRACT

An optical transceiver includes a receptacle, a ferrule and a ferrule fastening component. The receptacle includes a supporting portion and an inset portion connected with each other. The ferrule is disposed within the inset portion. The ferrule fastening component is disposed on the receptacle. The ferrule fastening component includes a first holding portion, a cap and a second holding portion connected together. The cap is located between the first holding portion and the second holding portion. The first holding portion touches the supporting portion, the second holding portion touches the ferrule, and the cap covers a first area of a top surface of the receptacle.

9 Claims, 5 Drawing Sheets

OPTICAL TRANSCEIVER

BACKGROUND

Technical Field

This present disclosure relates to an optical communication device, more particularly to an optical transceiver.

Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications such as XFP (10 Gigabit Small Form Factor Pluggable) used in 10 GB/s communication rate and QSFP (Quad Small Form-factor Pluggable) have been provided and employed.

In the optical transceiver, a fiber connector, such as MT-type ferrule, is used to retain multiple optical fibers in a fixed position within a fiber passageway, and the fiber connector is always held by its respective receptacle. Generally, the MT-type ferrule is bonded to the receptacle by glue.

SUMMARY

According to one aspect of the present disclosure, an optical transceiver includes a receptacle, a ferrule and a ferrule fastening component. The receptacle includes a supporting portion and an inset portion connected with each other. The ferrule is disposed within the inset portion. The ferrule fastening component is disposed on the receptacle. The ferrule fastening component includes a first holding portion, a cap and a second holding portion connected together. The cap is located between the first holding portion and the second holding portion. The first holding portion touches the supporting portion, the second holding portion touches the ferrule, and the cap covers a first area of a top surface of the receptacle.

According to another aspect of the present disclosure, an optical transceiver includes a receptacle, a ferrule and a ferrule fastening component. The receptacle includes a supporting portion and an inset portion connected with each other. The ferrule is disposed within the inset portion. The ferrule fastening component is disposed on the receptacle. The ferrule fastening component includes a first holding portion and a second holding portion connected to each other. The first holding portion touches the supporting portion, the second holding portion touches the ferrule, and the ferrule fastening component is a single piece without any assembling parts.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
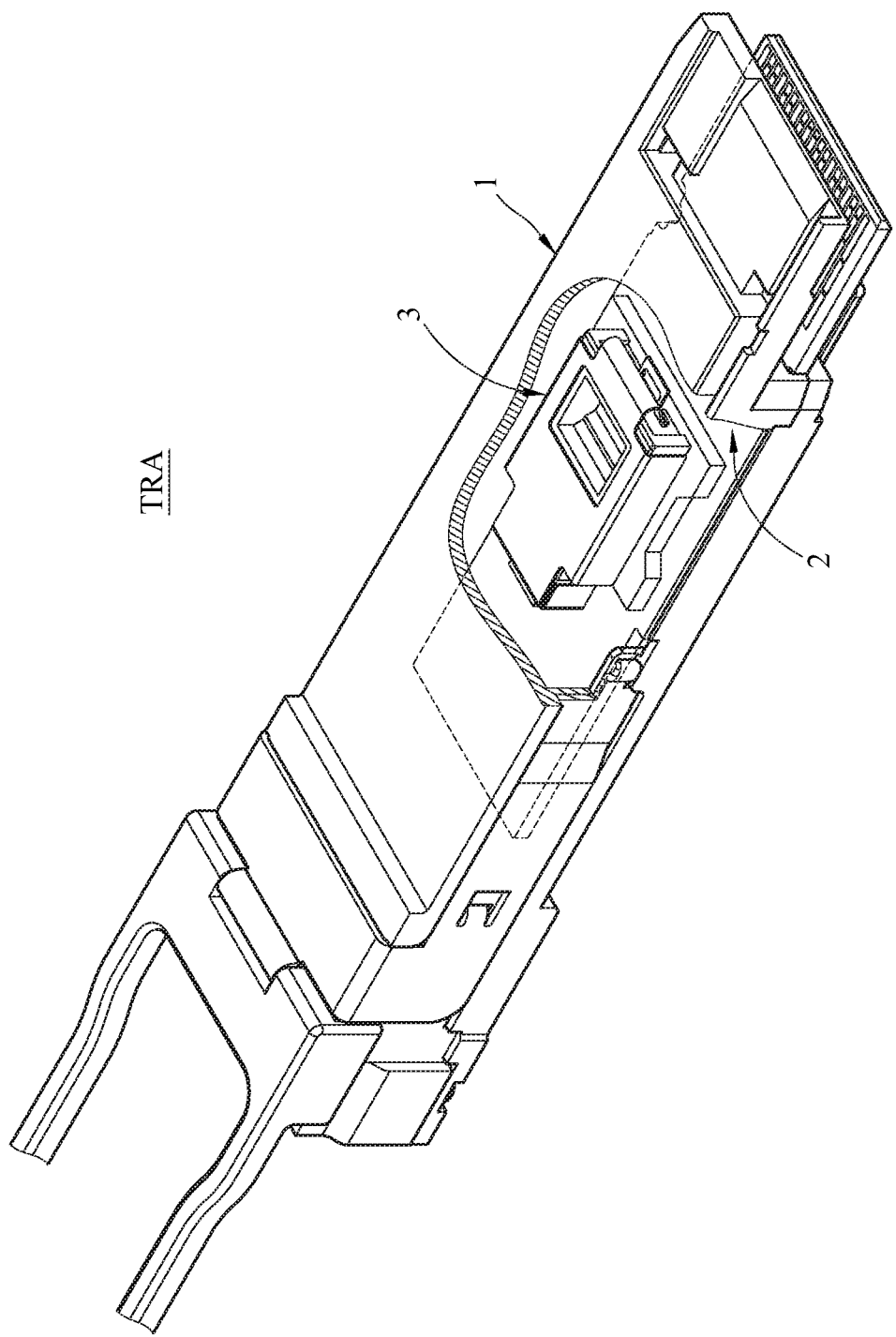
FIG. 1 is a perspective view of an optical transceiver according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
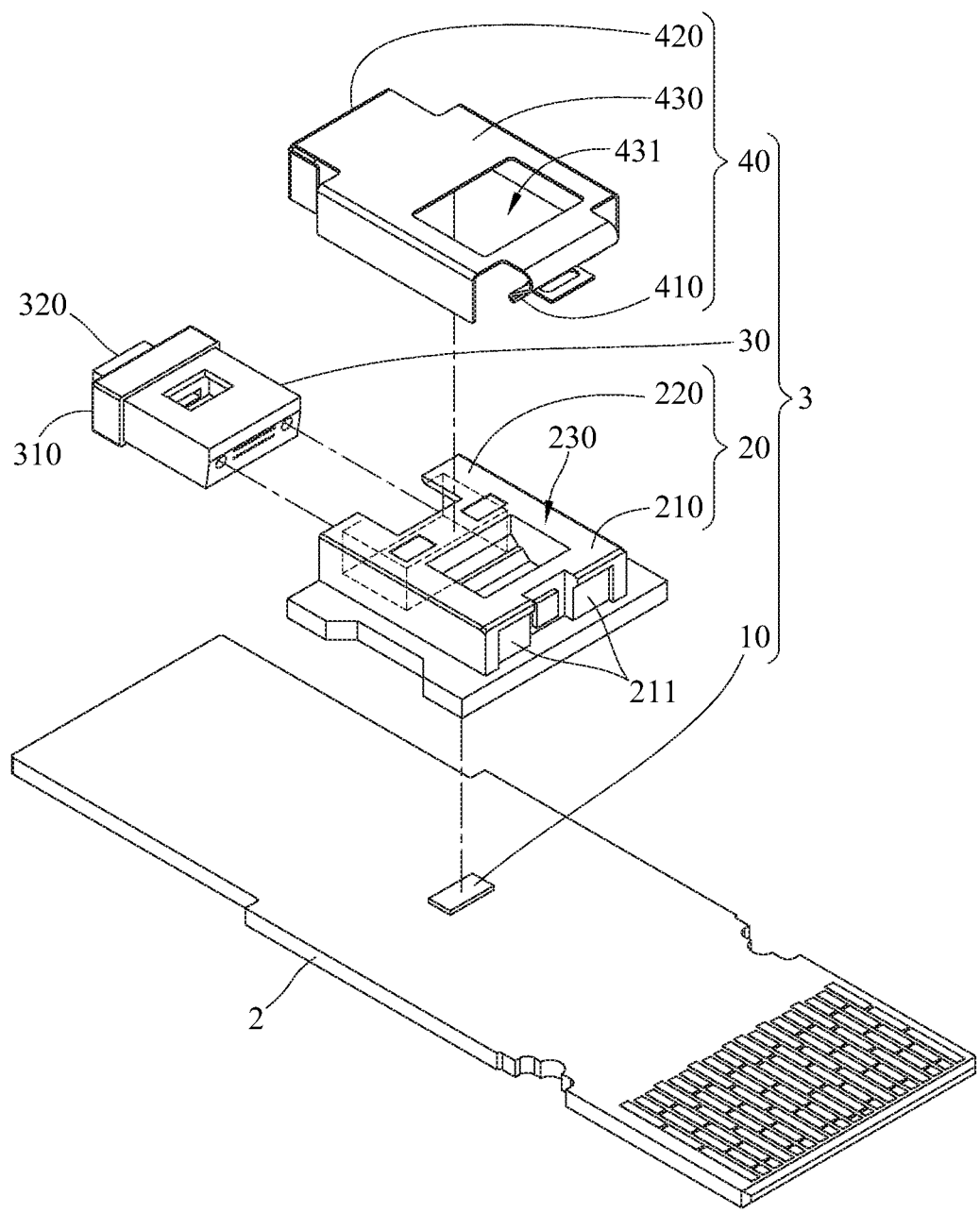
FIG. 2 is an exploded view of the optical transceiver in FIG. 1.
Figure 3:
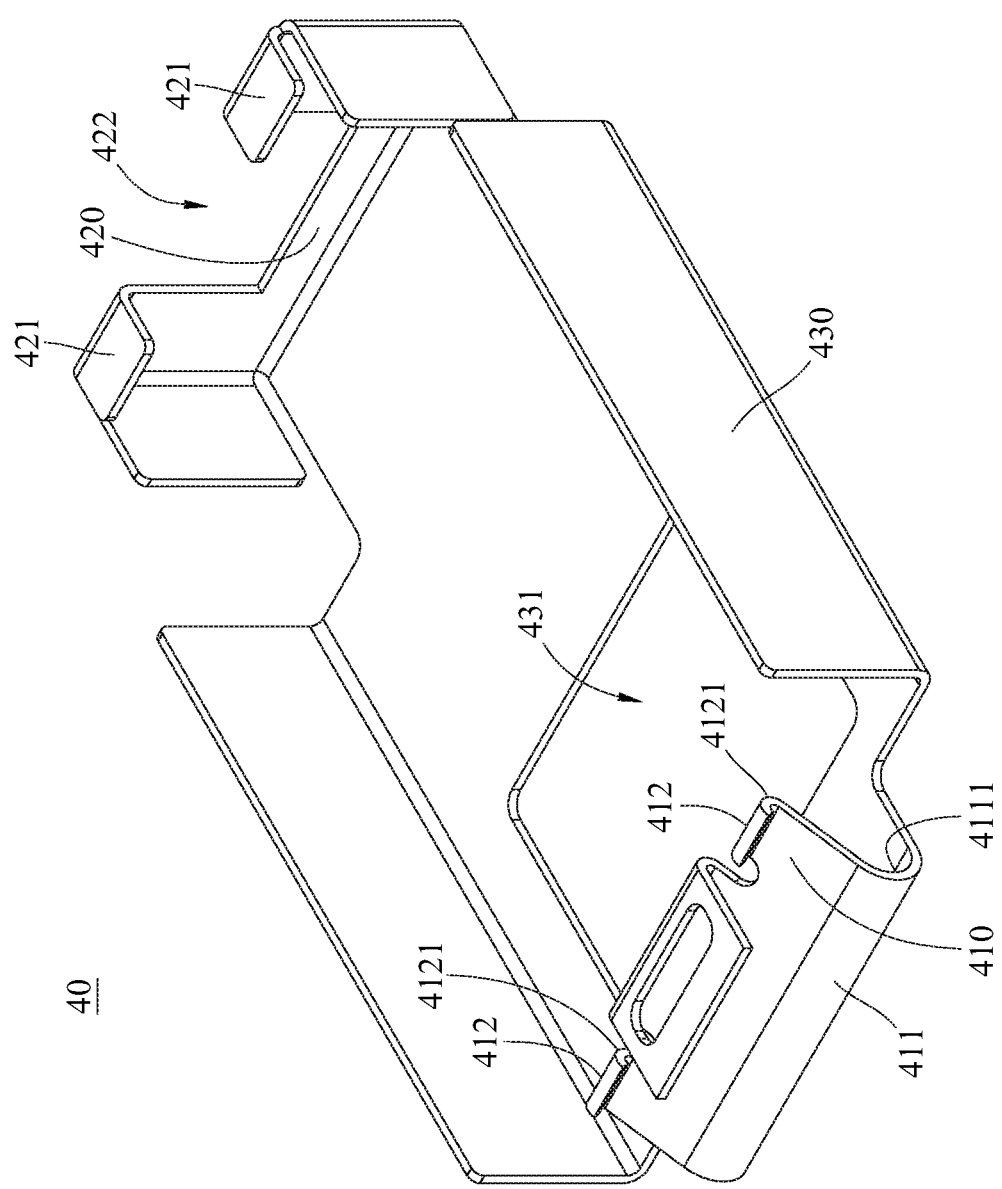
FIG. 3 is a perspective view of a ferrule fastening component in FIG. 2.

According to one embodiment of the present disclosure, an optical subassembly includes a receptacle, a ferrule and a ferrule fastening component. Please refer to FIG. 1 through FIG. 3. FIG. 1 is a perspective view of an optical transceiver according to an embodiment of the present disclosure. FIG. 2 is an exploded view of the optical transceiver in FIG. 1. FIG. 3 is a perspective view of a ferrule fastening component in FIG. 2. In this embodiment, an optical transceiver TRA, which is insertable into a cage in a pluggable manner, includes a case 1, a substrate 2 and an optical subassembly 3. The optical subassembly 3, disposed on the substrate 2, includes an optical active component 10, a receptacle 20, a ferrule 30 and a ferrule fastening component 40. The optical subassembly 3 may be a transmitter optical subassembly (TOSA) or a receiver optical subassembly (ROSA) in the optical transceiver TRA. The substrate 2, for example, is a circuit board or a package substrate disposed in the case 1. For the purpose of illustration, the case 1 is omitted in FIG. 2 through FIG. 5.

The optical active component 10, for example, is a laser diode or a photodiode disposed on the substrate 2. When the optical active component 10 receives optical signals, the optical signals could be transmitted to an IC chip (not shown in the drawings) and converted into electrical signals.

The receptacle 20 is disposed on the substrate 2 and located above the optical active component 10. The receptacle 20 includes a supporting portion 210 and an inset portion 220 connected with each other.

The ferrule 30, for example, is a MT-type ferrule for coupling multiple optical fibers to the optical active component 10. The ferrule 30 is disposed within the inset portion 220. Light transmitted in the optical fibers travels to a reflector inside the receptacle 20, and the reflected light is received by the optical active component 10. The reflector may be a silver film coated on the inner surface of the receptacle 20.

The ferrule fastening component 40, for example, is an elastic metal clip disposed on the receptacle 20. The ferrule fastening component 40 includes a first holding portion 410, a second holding portion 420 and a cap 430 connected together. The cap 430 is located between the first holding portion 410 and the second holding portion 420. The first holding portion 410 touches the supporting portion 210 of the receptacle 20, and the second holding portion 420 touches the ferrule 30, and the cap 430 covers a first area of a top surface 230 of the receptacle 20. In detail, the supporting portion 210 and the inset portion 220 jointly define the top surface 230. The top surface 230 includes a first area covered by the ferrule fastening component 40 and a second area exposed to outside. In this embodiment, the second area is smaller than the first area, and the first area surrounds the second area.

Figure 4:
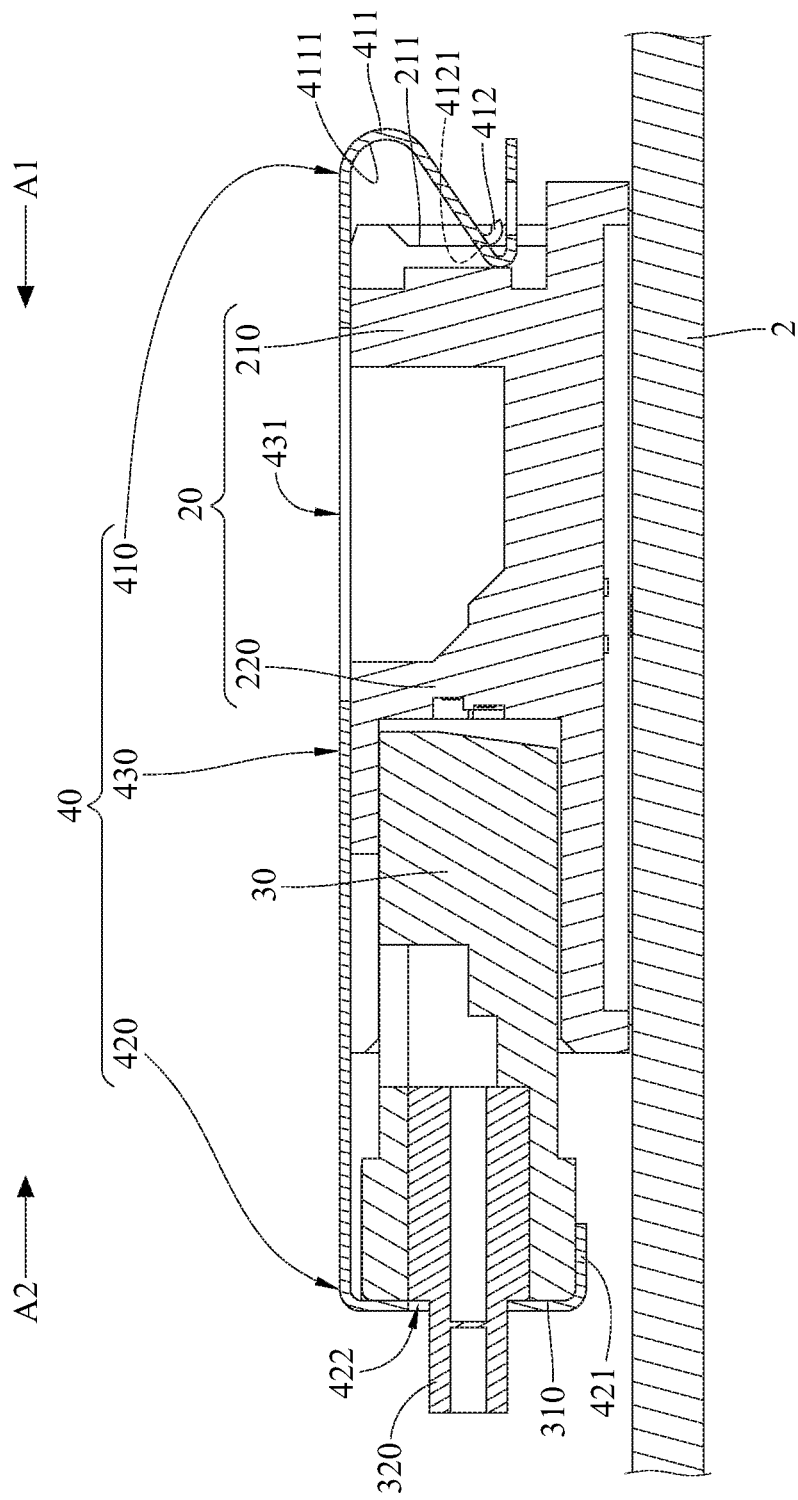
FIG. 4 is a cross-sectional view of the optical transceiver in FIG. 1.

According to one embodiment of the present disclosure, an interference fit is presented among the receptacle, the ferrule and the ferrule fastening component. Please refer to FIG. 4, which is a cross-sectional view of the optical transceiver in FIG. 1. As shown in FIG. 2 and FIG. 4, the interference fit is presented among the receptacle 20, the ferrule 30 and the ferrule fastening component 40 when the ferrule fastening component 40 is disposed on the receptacle 20. More specifically, the first holding portion 410 of the ferrule fastening component 40 touches a first supporting surface 211 of the supporting portion 210 of the receptacle 20, and the second holding portion 420 touches a second supporting surface 310 of the ferrule 30. As shown in FIG. 4, the first supporting surface 211 and the second supporting surface 310 are opposite to each other. The interference fit is achieved with the first holding portion 410 exerting an interaction upon the first supporting surface 211 in a direction A1 as well as the second holding portion 420 exerting an interaction upon the second supporting surface 310 in a direction A2. In one embodiment of the present disclosure, the first holding portion 410 and the second holding portion 420 respectively exert press force on the first supporting surface 211 and the second supporting surface 310 so as to achieve press fit.

According to one embodiment of the present disclosure, a window of the cap of the ferrule fastening component exposes part of the top surface of the receptacle. As shown in FIG. 3 and FIG. 4, a window 431 of the cap 430 exposes the second area of the top surface 230. When the receptacle 20 is a lensed optical connector (that is, the receptacle 20 is light-transmittable), a user can observe the optical active component 10 from the window 431 to inspect the coupling yield between the optical active component 10 and optical fibers (not shown in the drawings). Also, the cap 430 is favorable for obtaining a configuration of the ferrule fastening component 40 with high structural strength.

According to one embodiment of the present disclosure, the first holding portion of the ferrule fastening component includes a concave part and a convex part. As shown in FIG. 3 and FIG. 4, the first holding portion 410 of the ferrule fastening component 40 includes a concave part 411 and a convex part 412 connected with each other. The concave part 411 is connected with the cap 430, and is located between the cap 430 and the convex part 412. A concave surface 4111 of the concave part 411 and a convex surface 4121 of the convex part 412 face toward the supporting portion 210 of the receptacle 20, and the convex surface 4121 touches the first supporting surface 211 of the supporting portion 210. The convex part 412 may be less deformed than a flat part when touching the supporting portion 210, thereby achieving stable interference fit.

According to one embodiment of the present disclosure, the second holding portion of the ferrule fastening component includes at least one supporting part. As shown in FIG. 3 and FIG. 4, the second holding portion 420 of the ferrule fastening component 40 includes two supporting parts 421 located below the ferrule 30. The ferrule 30 is supported by the supporting parts 421. Therefore, the ferrule 30 could be prevented from dropping because of its own weight. It is worth noting that the protective scope of the present disclosure is not limited to the number of supporting parts 421 shown in FIG. 3.

Figure 5:
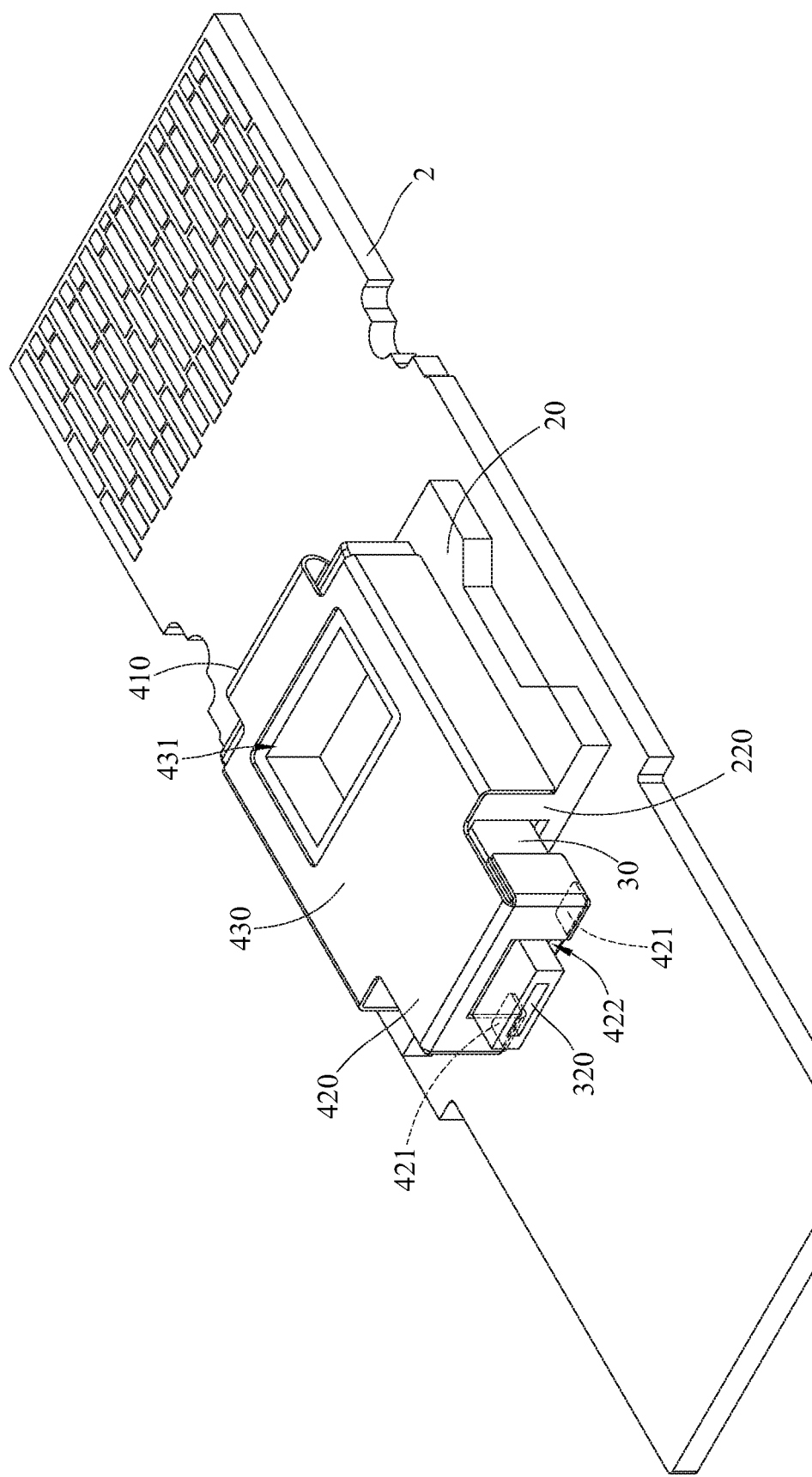
FIG. 5 is a perspective view of the optical transceiver in FIG. 4.

Please refer to FIG. 5, which is a perspective view of the optical transceiver in FIG. 4. According to one embodiment of the present disclosure, as shown in FIG. 4 and FIG. 5, the second holding portion 420 of the ferrule fastening component 40 covers part of the second supporting surface 310 of the ferrule 30. An opening 422 of the second holding portion 420 is formed between the two supporting parts 421. The opening 422 exposes an optical fiber terminal 320 located on the second supporting surface 310 of the ferrule 30. The design of opening 422 could prevent damage on the optical fibers passing through the optical fiber terminal 320 when the ferrule fastening component 40 is mounted and unmounted.

According to one embodiment of the present disclosure, as shown in FIG. 3, the ferrule fastening component 40 is monolithically formed. In detail, the first holding portion 410, the second holding portion 420 and the cap 430 are integrated together to be a single piece. Furthermore, the two supporting parts 421 of the second holding portion 420 are integrated together.

In a conventional optical transceiver, the ferrule disposed within the receptacle does not often stay at its expected position due to the external force, and thus the coupling efficiency between the active component and the optical fibers in the ferrule may be seriously and negatively affected. To solve this problem, according to the present disclosure, a ferrule fastening component is provided. When the ferrule fastening component is disposed on the receptacle, the interference fit among the receptacle, the ferrule and the ferrule fastening component could help minimize the occurrence of the ferrule not staying in its expected position.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical transceiver, comprising:
    an optical active component;
    a receptacle comprising a supporting portion and an inset portion connected with each other;
    a ferrule disposed within the inset portion;
    a ferrule fastening component disposed on the receptacle, the ferrule fastening component comprising a first holding portion, a cap and a second holding portion connected together, the cap being located between the first holding portion and the second holding portion, the first holding portion touching the supporting portion, the second holding portion touching the ferrule, and the cap covering a first area of a top surface of the receptacle; and
    wherein a window of the cap of the ferrule fastening component exposes a second area of the top surface of the receptacle and allows a user to observe the optical active component.

2. The optical transceiver according to claim 1, wherein the ferrule fastening component is monolithically formed.

3. The optical transceiver according to claim 1, wherein the first holding portion of the ferrule fastening component comprises a concave part and a convex part connected with each other, a concave surface of the concave part and a convex surface of the convex part face toward the supporting portion of the receptacle, the concave part is connected with the cap, and the convex surface of the convex part touches the supporting portion.

4. The optical transceiver according to claim 1, wherein the second holding portion of the ferrule fastening component comprises at least one supporting part located below the ferrule to help support the ferrule.

5. The optical transceiver according to claim 1, wherein the second holding portion of the ferrule fastening component touches a supporting surface of the ferrule, the second holding portion covers part of the supporting surface, and an opening of the second holding portion exposes an optical fiber terminal located on the supporting surface of the ferrule.

6. The optical transceiver according to claim 1, wherein the first holding portion of the ferrule fastening component touches a first supporting surface of the supporting portion of the receptacle, the second holding portion of the ferrule fastening component touches a second supporting surface of the ferrule, and the first supporting surface is opposite to the second supporting surface.

7. The optical transceiver according to claim 1, wherein an interference fit is presented among the receptacle, the ferrule and the ferrule fastening component.

8. The optical transceiver according to claim 1, wherein the ferrule is a MT-type ferrule.

9. An optical transceiver, comprising:
an optical active component;
a receptacle comprising a supporting portion and an inset portion connected with each other;
a ferrule disposed within the inset portion;
a ferrule fastening component disposed on the receptacle, the ferrule fastening component comprising a first holding portion, a cap and a second holding portion connected to each other, the cap being located between the first holding portion and the second holding portion, the first holding portion touching the supporting portion, the second holding portion touching the ferrule, and the cap covering a first area of a top surface of the receptacle, wherein the ferrule fastening component is a monolithically formed; and
wherein a window of the cap of the ferrule fastening component exposes a second area of the top surface of the receptacle and allows a user to observe the optical active component.

* * * * *